United States Patent
Hirayama

(10) Patent No.: US 9,261,130 B2
(45) Date of Patent: Feb. 16, 2016

(54) VEHICLE COMPONENT FIXTURE

(71) Applicant: Kojima Industries Corporation, Toyota-shi, Aichi (JP)

(72) Inventor: Tomiyasu Hirayama, Toyota (JP)

(73) Assignee: Kojima Industries Corporation, Toyota-shi, Aichi (JP)

(*) Notice: Subject to any disclaimer, the term of this patent is extended or adjusted under 35 U.S.C. 154(b) by 7 days.

(21) Appl. No.: 14/147,165

(22) Filed: Jan. 3, 2014

(65) Prior Publication Data

US 2014/0219739 A1 Aug. 7, 2014

(30) Foreign Application Priority Data

Feb. 4, 2013 (JP) .................................. 2013-19420

(51) Int. Cl.
*F16B 43/00* (2006.01)
*F16B 41/00* (2006.01)

(52) U.S. Cl.
CPC ............... *F16B 41/002* (2013.01); *F16B 43/00* (2013.01)

(58) Field of Classification Search
CPC .... F16B 5/0233; F16B 43/00; F16B 43/0225; F16B 35/06; F16B 5/2025
USPC .......................................... 411/546, 533, 396
See application file for complete search history.

(56) References Cited

U.S. PATENT DOCUMENTS

| 1,143,091 | A | * | 6/1915 | Stimpson | 411/545 |
| 1,262,975 | A | * | 4/1918 | Pierce | 470/27 |
| 1,852,131 | A | * | 4/1932 | Shugrue | 411/396 |
| 2,491,085 | A | * | 12/1949 | Burrows | 411/80.2 |
| 4,238,165 | A | * | 12/1980 | Wagner | 403/408.1 |
| 4,321,001 | A | * | 3/1982 | Gruich | 411/396 |
| 4,399,642 | A | * | 8/1983 | Bard et al. | 52/483.1 |
| 4,437,784 | A | * | 3/1984 | Peterson | 403/408.1 |
| 5,466,105 | A | * | 11/1995 | McKay et al. | 411/84 |
| 7,370,878 | B2 | * | 5/2008 | Nakazawa | 280/728.2 |
| 7,784,150 | B2 | * | 8/2010 | Anderson et al. | 16/2.1 |
| 8,807,896 | B2 | * | 8/2014 | McKinlay | 411/147 |
| 2002/0154484 | A1 | * | 10/2002 | Gorlich | 361/704 |
| 2006/0228194 | A1 | * | 10/2006 | Nilsen et al. | 411/546 |

* cited by examiner

*Primary Examiner* — Flemming Saether
(74) *Attorney, Agent, or Firm* — Eric D. Babych; Brinks Gilson & Lione

(57) ABSTRACT

Disclosed is a fixture to fix a vehicle component which comprises a metallic bolt to fix the vehicle component having a threaded portion to be threaded into a nut to fasten the vehicle component to the support member; a metallic bracket having a through-hole into which the threaded portion is inserted, the bracket holding the vehicle component between the bracket and the support member; and a metallic washer into which the threaded portion is inserted, the washer comprising a washer portion which contacts a peripheral edge of the fixture hole of the support member on the same side as the vehicle component and a locking portion which is provided integrally with the washer portion to be locked with and thus integrated with the bracket. According to the above constitution, the loosening of the nut can be prevented to stably maintain the earth performance of the vehicle body.

3 Claims, 3 Drawing Sheets

VEHICLE COMPONENT FIXTURE

CROSS-REFERENCE TO RELATED APPLICATION(S)

This application claims priority to Japanese Patent Application No. 2013-19420, filed on Feb. 4, 2013, which is incorporated herein by reference in its entirety.

TECHNICAL FIELD

The present invention relates to a fixture to fix a vehicle component to a metallic support member to be electrically connected to a vehicle body.

BACKGROUND ART

A fixture 1 shown in FIG. 1 and FIG. 2 has heretofore been used to fix a vehicle component such as a spoiler, which is a plastic molding, to a support member to be electrically connected to a vehicle. FIG. 1 is a sectional view of the fixture 1. FIG. 2 is a sectional view showing how a vehicle component 3 is fixed, by the use of the fixture 1, to a support member 4 secured to the vehicle.

This fixture 1 includes a bolt 12, a bracket 14, a washer 16, and a cushion member 18.

The bolt 12 is a metallic fastening member, and comprises a flat disk-shaped head 12a, an intermediate portion 12b having, for example, a columnar shape coupled to the head 12a, and a threaded portion 12c coupled to the intermediate portion 12b. An external thread is formed on the outer periphery of the threaded portion 12c. The intermediate portion 12b is formed to be larger in diameter than the threaded portion 12c, and a step 13 is formed therebetween.

The bracket 14 is a metallic plate material to hold and secure the vehicle component 3 between the bracket 14 and the metallic support member 4 to be electrically connected to a vehicle body. A through-hole 15 is formed in the bracket 14, and the intermediate portion 12b of the bolt 12 is inserted into this through-hole. The head 12a of the bolt 12 is engaged with the peripheral edge of the through-hole 15 of the bracket 14. In this condition, the head 12a of the bolt 12 is welded to the bracket 14, and the bolt 12 is thereby secured to the bracket 14.

The washer 16 is an annular metallic plate material. The washer 16 is provided to prevent the loosening of a nut 5 threaded and thus tightened to the threaded portion 12c of the bolt 12. The washer 16 contacts the step 13 of the bolt 12 when the bolt 12 is tightened, and is thereby electrically connected to the bolt 12 and the bracket 14.

The cushion member 18 is a flexible plate-shaped or sheet-shaped member made of, for example, a sponge or rubber. The cushion member 18 is provided, for example, to prevent the washer 16 from coming off the threaded portion 12c of the bolt 12.

The fixture 1 configured as described above is used to fix the vehicle component 3 to the support member 4 of the vehicle in the following procedure.

First, the threaded portion 12c of the bolt 12 secured integrally with the bracket 14 is inserted into a through-hole 3a formed in the vehicle component 3.

The washer 16 and the cushion member 18 are then sequentially inserted into the threaded portion 12c of the bolt 12 projecting from the vehicle component 3 on the side opposite to the bracket 14. In consequence, as shown in FIG. 1, the fixture 1 is mounted to the vehicle component 3.

The vehicle component 3 to which the fixture 1 is mounted is then lifted to insert the threaded portion 12c of the bolt 12 into a fixture hole 4a of the support member 4 of the vehicle, and the threaded portion 12c projecting from the support member 4 on the side opposite to the fixture 1 is then tightened into the nut 5. As a result, the vehicle component 3 is fastened and secured to the support member 4 of the vehicle by the fixture 1.

When the vehicle component 3 is attached in this way, the flexible cushion member 18 is formed into a thin sheet shape compressed by being held between the support member 4, the washer 16, and the vehicle component 3. The cushion member 18 thus compressed functions, together with the washer 16, to prevent loosening of the nut 5. That is, the resilient restoration force of the compressed cushion member 18 is used as tensile force for the threaded portion 12c of the bolt 12. The nut 5 is thereby pressed against the support member 4, and loosening of the nut 5 is thus prevented.

The fixture 1 may be used as a ground portion to earth the vehicle body. In this case, the metallic support member 4 to be electrically connected to a vehicle body comes into metallic contact with and is secured with the bolt 12, the bracket 14, the washer 16, and the nut 5, whereby they are electrically connected to each other. Accordingly, the vehicle body is earth-connected via the fixture 1 and the metallic support member 4, with the result that this earth-connection inhibits the deterioration of radio receiving sensitivity and the generation of radio noise that are caused by performance deterioration of an in-vehicle radio antenna.

No prior-art literature related to such a fixture has been discovered through investigation conducted by the applicant.

In the fixture 1 described above, the effect of preventing loosening of the nut 5 deteriorates when the resilient restoration force of the cushion member 18 is reduced by aged deterioration. Accordingly, the nut may loosen and come off.

If the nut 5 loosens, the bolt 12, the bracket 14, the washer 16, and the nut 5 cannot be kept stably in metallic contact in the fixture 1, and the earth performance of the vehicle body may deteriorate. This can cause problems of radio receiving sensitivity deterioration and radio noise generation.

Moreover, when the fixture 1 is used to attach the vehicle component 3 as described above, an assembly operator has to pass the threaded portion 12c of the bolt 12 through the vehicle component 3 and then insert the washer 16. This causes such problems as the washer 16 being dropped.

SUMMARY OF THE INVENTION

An object of the present invention is to provide a fixture capable of preventing loosening of a nut and thus stably maintaining the earth performance of a vehicle body, and also capable of improving efficiency in the operation of attaching a vehicle component.

The present invention is directed to a fixture to fix a vehicle component to a metallic support member to be electrically connected to a vehicle body, the vehicle component fixture comprising a metallic bolt to fasten and thus fix the vehicle component, a threaded portion of the bolt to be inserted into a fixture hole of the support member being threaded into a nut, to fasten the vehicle component to the support member; a metallic bracket having a through-hole into which the threaded portion of the bolt is inserted so that a head of the bolt is engaged with a peripheral edge of the through-hole, the bracket holding the vehicle component between the bracket and the support member; and a metallic washer into which the threaded portion of the bolt is inserted, the washer comprising a washer portion which contacts a peripheral edge of the fixture hole of the support member on the same side as the vehicle component and a locking portion which is provided integrally with the washer portion to be previously locked with and thus integrated with the bracket.

In the fixture for the vehicle component of the present invention, the locking portion of the washer may be locked with the bracket by the bending of the tip of the locking portion projecting through a through-hole formed in the bracket.

Furthermore, in the fixture for the vehicle component of the present invention, the locking portion of the washer may be formed with a step which comes into contact with the peripheral edge of the through-hole of the bracket, thereby positioning the washer portion relative to the bracket.

According to the fixture of the present invention, the bolt, the bracket, and the washer constituting the fixture are secured in metallic contact, when the nut is tightened to fasten the vehicle component to the support member. No cushion member that causes the nut to loosen by aged deterioration is used, so that the fastening force at the time of tightening can be maintained, and the loosening of the nut can be effectively inhibited. These can prevent the nut coming off, and stably maintain the electrical connection of the fixture and the metallic support member. Therefore, the earth performance is improved when the vehicle body is earth-connected via the fixture, and in-vehicle radio receiving sensitivity deterioration and radio noise generation can be inhibited. Moreover, as the washer is integrated with the bracket, the efficiency in the operation of attaching the vehicle component by the use of the fixture is improved.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE EMBODIMENTS

Figure 1:
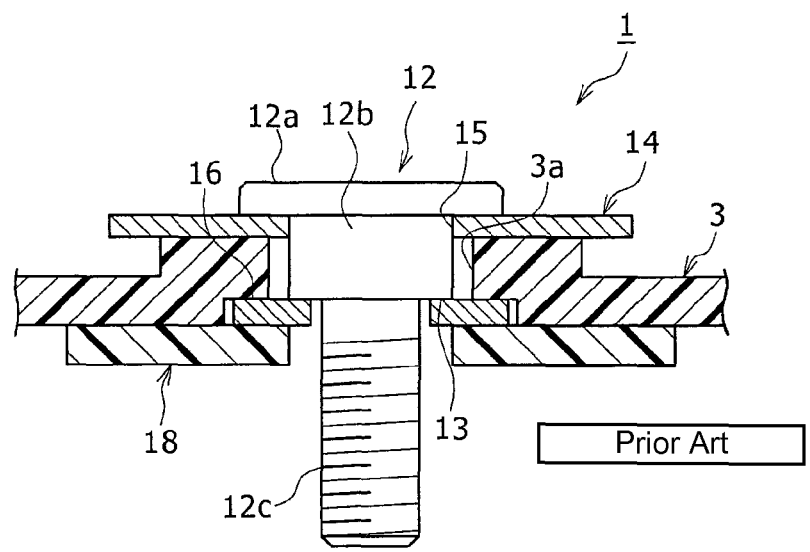
FIG. 1 is a sectional view of a conventional fixture.

Hereinafter, an embodiment according to the present invention will be described in detail with reference to the accompanying drawings. In this description, specific shapes, materials, numerical values, and directions are illustrative only to simplify the understanding of the present invention, and can be suitably modified according to, for example, use, purposes, and specifications. When a plurality of embodiments and modifications are included below, the use of the combination of their features is assumed originally.

A fixture 2 according to the present embodiment is described with reference to FIGS. 3 to 6. In the following description, the same components as those in the conventional fixture 1 described above are referred to with the same reference numerals, and repeated explanations may be omitted.

The fixture 2 according to the present embodiment comprises a bolt 12, a bracket 20, and a washer 22. The bolt 12 is similar to that in the conventional fixture 1 described above, and includes a head 12a, an intermediate portion 12b, and a threaded portion 12c and has a step 13 at a boundary between the intermediate portion 12b and the threaded portion 12c.

Figure 3:
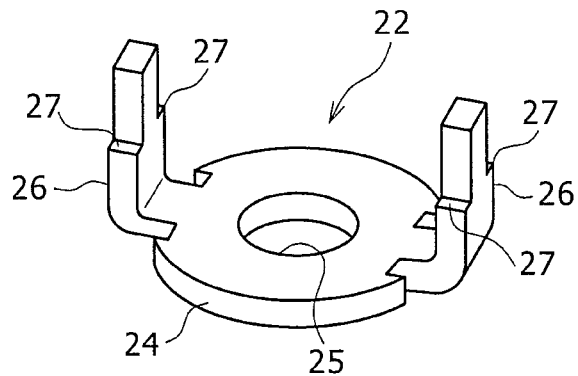
FIG. 3 is a perspective view of a washer in a fixture according to an embodiment.
Figure 4:
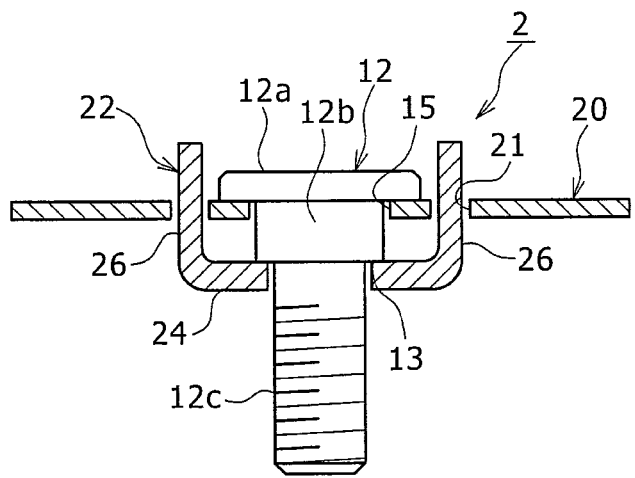
FIG. 4 is a diagram showing how a locking arm of the washer in FIG. 3 is inserted into a locking hole of a bracket.

FIG. 3 is a perspective view of the washer 22 in the fixture 2 according to the present embodiment. FIG. 4 is a diagram showing how locking arms 26 of the washer 22 in FIG. 3 are inserted into locking holes 21 of the bracket 20.

The bracket 20 is a metallic plate material to hold and secure a vehicle component 3 between the bracket 20 and a metallic support member 4 to be electrically connected to a vehicle body. Here, the metallic support member 4 may constitute a part of the vehicle body, or may be a member which is secured so as to be electrically connected to the vehicle body.

A through-hole 15 into which the intermediate portion 12b of the bolt 12 is inserted is formed in the bracket 20. In the bracket 20, the locking holes 21 into which the later-described locking arms 26 of the washer 22 are inserted are formed adjacent to the through-hole 15. In the present embodiment, two locking holes 21 are formed to correspond to two locking arms 26 of the washer 22.

As shown in FIG. 3, the washer 22 comprises an annular washer portion 24 including a bolt hole 25 into which the threaded portion 12c of the bolt 12 is inserted, and the locking arms (locking portions) 26 integrally provided continuously to the outer peripheral edge of the washer portion 24. Two locking arms 26 are provided at opposite positions in the diametrical direction of the washer portion 24, and extend in a direction substantially perpendicular to a plane including the washer portion 24. The number of the locking arms 26 is not limited to two, and may be one or may be three or more.

The washer 22 can be manufactured, for example, by press-cutting a metallic plate material to form a combination of the washer portion 24 and the locking arm 26 and then bending the locking arms 26.

Steps 27 are formed on both sides of the locking arm 26 of the washer 22. The steps 27 are engaged with the peripheral edges of the locking holes 21 when the locking arms 26 are inserted in the locking holes 21 of the bracket 20. As a result, the steps 27 of the locking arm 26 function to position the washer portion 24 apart from the bracket 20 within a predetermined distance range.

Figure 6:
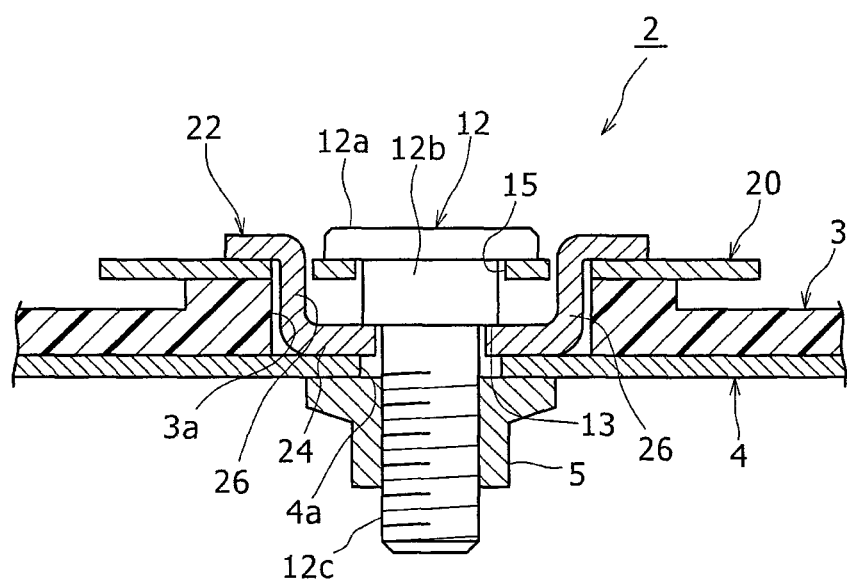
FIG. 6 is a sectional view corresponding to FIG. 2, showing how a vehicle component is fixed to a support member constituting a vehicle body by the use of the fixture in FIG. 5.

However, the accuracy of this positioning may be low. More specifically, the accuracy may be at such a level that allows the washer 22 to wobble in a direction in which the washer 22 faces the bracket 20 even after the locking arm 26 is bent to ensure that the step 13 of the bolt 12 contacts the washer portion 24 of the washer 22 when the vehicle component 3 is secured to the metallic support member 4 by the fixture 2 and the nut 5 as shown in FIG. 6.

Figure 5:
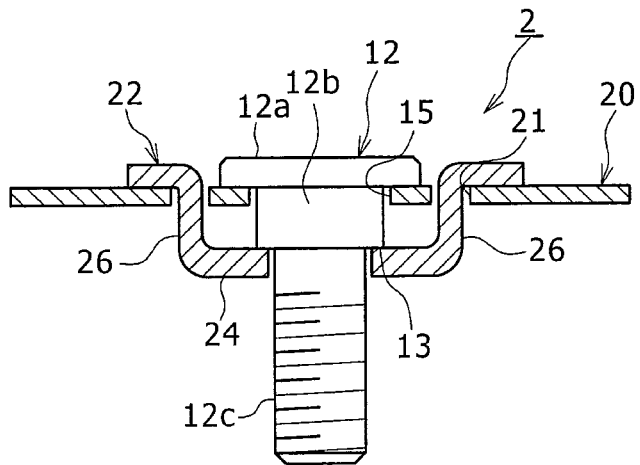
FIG. 5 is a diagram showing how the locking arm of the washer in FIG. 4 is bent and integrated with the bracket.

FIG. 5 is a diagram showing how the locking arms of the washer in FIG. 4 are bent and integrated with the bracket. The fixture 2 according to the present embodiment is assembled as follows.

First, the bolt 12 is inserted into the through-hole 15 of the bracket 20. The head 12a of the bolt 12 is then welded and thereby secured to the bracket 20. The bolt 12 may be secured to the bracket 20 not exclusively by welding but by some other means, for example, caulking, press fitting, or adhesive bonding.

As shown in FIG. 4, the threaded portion 12c of the bolt 12 is then inserted into the washer portion 24 of the washer 22, and the locking arms 26 of the washer 22 are inserted into the locking holes 21 of the bracket 20.

As shown in FIG. 5, the tips of the locking arms 26 of the washer 22 projecting from the locking holes 21 of the bracket 20 are then bent in a direction along the bracket 20. As a result, the washer 22 is integrally locked with the bracket 20.

In the fixture 2 thus assembled, the bolt 12, the bracket 20, and the washer 22 are previously integrated, so that the washer does not come off when the fixture 2 is used to attach the vehicle component, and the efficiency in the attachment operation is therefore improved. As a result, attachment can be automated.

Figure 2:
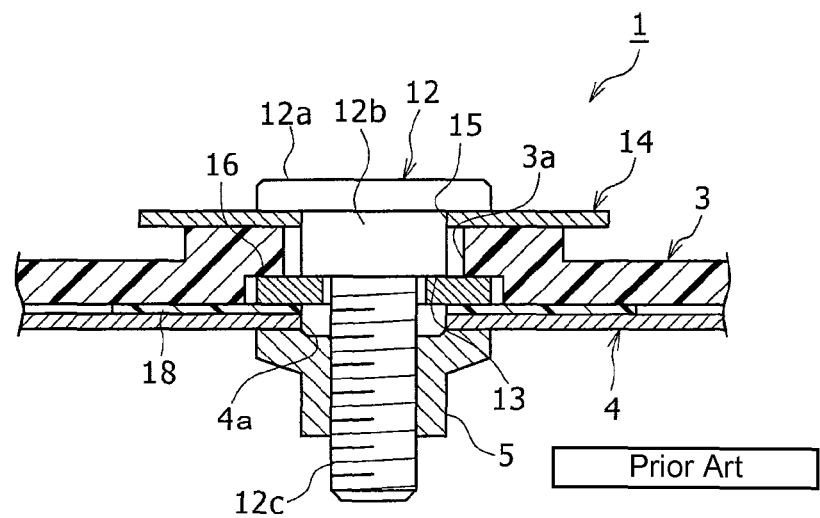
FIG. 2 is a sectional view showing how a vehicle component is fixed to a support member constituting a vehicle body by the use of the fixture in FIG. 1.

Now, attachment of the vehicle component using the fixture 2 according to the present embodiment is described with reference to FIG. 6. FIG. 6 is a sectional view corresponding to FIG. 2, showing how the vehicle component 3 is fixed to the support member 4 constituting the vehicle body by the use of the fixture 2 in FIG. 5.

First, a assembly operator puts the fixture 2 over a fixture hole 3a of the vehicle component 3. In this case, the fixture hole 3a of the vehicle component 3 is formed into a size that receives the locking arms 26 of the washer 22 of the fixture 2.

The assembly operator then lifts the vehicle component 3 to insert the threaded portion 12c of the bolt 12 projecting from the vehicle component 3 into a fixture hole 4a of the metallic support member 4 constituting the vehicle body.

The assembly operator then threads and thus tightens the threaded portion 12c projecting on the opposite side through the fixture hole 4a of the support member 4 into the nut 5. As a result, the vehicle component 3 is fastened and secured so as to be held between the bracket 20 and the support member 4.

As described above, the fixture 2 according to the present embodiment is configured to fix the vehicle component 3 without the use of a flexible cushion member. When the fixture 2 is fastened to the support member 4 by the nut 5, this ensures that the bolt 12, the bracket 20, and the washer 22 that constitute the fixture 2, the nut 5, and the support member 4 are secured in metallic contact. This can prevent or inhibit the loosening of the nut caused by the aged deterioration of the cushion member, and prevent the nut 5 coming off.

As the nut does not easily loosen, the fastening force at the time of tightening can be maintained, and the electrical connection of the fixture 2 and the metallic support member 4 can be stably maintained. Therefore, the earth performance is improved when the support member 4 connected to the vehicle body is earth-connected via the fixture 2, and in-vehicle radio receiving sensitivity deterioration and radio noise generation can be inhibited.

Moreover, as the washer 22 is integrated with the bracket 20, the efficiency in the operation of attaching the vehicle component by the use of the fixture 2 is improved.

Another advantage is that the number of components and the cost of the fixture 2 can be reduced by the elimination of the cushion member.

The fixture according to the present invention is not limited to the embodiment described above and its modifications, and various modifications and improvements can be made within the scope of the matter set forth in the claims of the present application and their equivalents.

For example, the washer 22 is integrated with the bracket 20 by the bending of the locking arm 26 in the above description. However, the present invention is not limited thereto. For example, the locking arm of the washer may be secured to the bracket by caulking or welding. Alternatively, the locking arm may be locked by some other member (e.g. by winding an adhesive tape, attaching a binding band, placing a cap, or adhesively bonding with an adhesive agent).

Although the fixture 2 which includes the bolt 12 having the step 13 formed therein is described above, a bolt having no step formed therein may be used instead.

The head 12a of the bolt 12 is secured to the bracket 20, for example, by welding in the above description, but does not always have to be secured.

It should be understood that the vehicle component fixed by the fixture according to the present invention is not limited to a spoiler and the fixture is applicable to secure any part of the vehicle that is made of resin.

What is claimed is:

1. A vehicle component fixture to fix a vehicle component to a metallic support member to be electrically connected to a vehicle body, the vehicle component fixture comprising:
   a metallic bolt to fasten and thus fix the vehicle component, a threaded portion of the bolt to be inserted into a fixture hole of the support member being threaded into a nut, to fasten the vehicle component to the support member;
   a metallic bracket having a through-hole into which the threaded portion of the bolt is inserted so that a head of the bolt is engaged with a peripheral edge of the through-hole, the bracket holding the vehicle component between the bracket and the support member; and
   a metallic washer into which the threaded portion of the bolt is inserted, the washer having a washer portion which contacts a peripheral edge of the fixture hole of the support member on the same side as the vehicle component and a locking portion which is provided integrally with the washer portion to be previously locked with and thus integrated with the bracket,
   wherein the head of the bolt is welded and thereby secured to the bracket.

2. The vehicle component fixture according to claim 1, wherein the locking portion of the washer is locked with the bracket by the bending of a tip of the locking portion projecting through a through-hole formed in the bracket.

3. The vehicle component fixture according to claim 2, wherein the locking portion of the washer is formed with a step which comes into contact with the peripheral edge of the through-hole of the bracket, thereby positioning the washer portion relative to the bracket.

\* \* \* \* \*